3,376,173
ENCAPSULATION OF LIGHT METAL HYDRIDES AS ROCKET PROPELLANTS
David R. Carley and James H. Dunn, Baton Rouge, La., assignors to Ethyl Corporation, New York, N.Y., a corporation of Virginia
No Drawing. Filed May 2, 1960, Ser. No. 26,365
5 Claims. (Cl. 149—5)

The present invention is concerned with a method for coating or encapsulating a metal hydride with a metal, especially aluminum metal.

Many techniques have been proposed heretofore for coating various materials, especially structural metals, with aluminum metal. Generally, such techniques have involved vacuum metallization operations. By way of example, aluminum has been vaporized at high temperatures under vacuum to deposit a film of aluminum upon a metal. The high temperatures employed are disadvantageous and the technique is not amenable toward depositing an even coating upon the desired surface area. Attempts have been made to apply such techniques employing alkyl aluminum compounds. The principal disadvantage to these procedures has been the fact that again very high temperatures are required to effect the coating of the metal. All of these techniques are even further disadvantageous when one attempts to place a coating of aluminum upon a metal hydride. The metal hydrides generally decompose at relatively low temperatures as below about 250° C. and the more desirable hydrides at below about 160° C.

Accordingly, the presently known methods for applying a coating of aluminum metal upon various substrates suffer particular and peculiar inherent disadvantages and there is no convenient way for using these techniques for coating or encapsulating metal hydrides with aluminum. It is particularly desirable to provide a method for coating metal hydrides with aluminum since the metal hydrides are excellent rocket propellants, but being highly reactive need to be maintained in a form adaptable to easy handling without destroying their propellant properties. Aluminum coatings are particularly desirable for this purpose since the aluminum serves a dual function, namely providing the metal hydride in a form which is easily handled and essentially non-reactive to the atmosphere and additionally providing a further source of propellant energy.

Accordingly, an object of this invention is to provide a new and novel process for coating or encapsulating materials with a film of aluminum metal. A particular object is to provide a unique process for coating metal hydrides uniformly and effectively with a film of aluminum metal. A specific object is the provision of a novel technique for encapsulating alkali metal aluminum hydrides, or alkali metal borohydrides. These and other objects will be evident as the discussion proceeds.

The above and other objects of this invention are accomplished by contacting a complex of aluminum hydride and a tertiary amine with a solid metal hydride which is maintained at a temperature above the decomposition temperature of aluminum hydride, but below the decomposition temperature and melting point of the metal hydride to be coated. Aluminum hydrides complexed with tertiary lower alkyl amines are particularly advantageous, especially wherein the alkyl groups have up to about 4 carbon atoms each, such as trimethylamine and triethylamine. The hydrides to be coated are preferably the Group I-A and II-A metal hydrides, especially the bimetallic hydrides, such as lithium or sodium aluminum hydride, or lithium or sodium borohydride. For best results, the temperature at which the aluminum hydride complex is contacted with the metal hydride is between about 90–150° C. Thus, particularly preferred embodiments of the present invention comprise the contacting of lithium aluminum hydride, sodium aluminum hydride, sodium borohydride, beryllium hydride, magnesium aluminum hydride, or lithium borohydride with aluminum hydride-trimethylamine complex or aluminum hydride-triethylamine complex at 90–150° C.

The present invention provides a very efficient procedure for coating aluminum metal upon metal hydrides. Among the advantages of the technique is the feature that the coating is obtained at very moderate, low temperatures of operation, whereas the prior art techniques have required comparatively high temperatures. Further, the technique results in a uniform coating of the aluminum upon the surface area of the metal hydride regardless of its form and more effective plating than possible heretofore is achieved even in the instance of highly porous substrate material. The resulting encapsulated metal hydride is of greater stability to the atmosphere and is easier to handle than metal hydrides encapsulated by the prior art techniques. These and other advantages of the process will be evident as the discussion proceeds.

The present invention will be more readily understood and illustrated by the following examples wherein all parts are by weight unless otherwise specified.

Example I

The apparatus employed comprised a column for effecting a fluidized bed in which, at the base, a means for passage of an inert gas was provided and a porous frit for supporting the aluminum hydride complex in the lower zone, and in the central zone was provided a second porous frit for supporting lithium aluminum hydride and a means for externally heating this zone to the desired temperature. The top of the column was also provided with a means for maintaining a vacuum and collecting off-gases, including a Dry Ice trap. To the lower zone was added 1 part of aluminum hydride-trimethylamine complex [$AlH_3 \cdot N(CH_3)_3$], and in the central zone on the upper frit was added 5 parts of 40–60 mesh lithium aluminum hydride. The column was heated in the central zone to 91° C. and then evacuated to 11 mm. of mercury. Then, hydrogen gas was fed to the column at a rate of about 1.8 cu. ft./hr./sq. in. internal cross sectional area of the reactor column to effect gentle motion of the lithium aluminum hydride. The section containing the aluminum hydride complex was then gently heated to about 40° C. The system was then maintained between 96–104° C. in the central zone, at about 40° C. in the complex zone, with the vacuum between 13–17 mm. of mercury and the hydrogen flow between 1.0 to 2.0 cu. ft./hr./sq. in. internal cross sectional area of the reactor column for 2 hours. 0.6 part of the aluminum coated lithium aluminum hydride product obtained was then placed in a flask along with 100 parts of dioxane to which was added 70 parts of dioxane mixed with 8 parts of methanol to check the effectiveness of the encapsulation. At the end of 5 minutes, 43 cc. of hydrogen had been collected, at the end of 30 minutes, 95 cc. of hydrogen had been collected, and at the end of 110 minutes, 152 cc. of hydrogen had been collected, whereas the uncoated lithium aluminum hydride liberated 500 cc. of hydrogen in 6 minutes under the same conditions.

To further illustrate the effectiveness of the present coating process, uncoated lithium aluminum hydride was exposed to an atmosphere having a 42 percent relative humidity. Rapid disintegration took place, moisture was absorbed, and the hydride turned white. In contrast, when lithium aluminum hydride coated with aluminum by the present process was exposed to the same atmosphere for several hours, no visual effects were noted.

Example II

In this run, the reactor employed was a rotating tube inclined at an angle of 10–15 degrees from the horizontal into which was first placed 1 part of aluminum hydride-trimethylamine complex and then a glass wool support was inserted upon which 10 parts of lithium aluminum hydride of mesh between 40–60 was placed. The tube was then subjected to a vacuum of 0.5 mm. of mercury and the lithium aluminum hydride portion of the tube was heated and maintained between 111–126° C. for 3 hours and 20 minutes while maintaining the vacuum between 0.5 to 0.6 mm. of mercury with continuous rotation at 71 r.p.m., with gentle heating of the complex, and collecting the condensable gases in a Dry Ice trap. As in Example I, 0.6 part of the product so-coated was treated with the dioxane-methanol solution and the amount of hydrogen evolved measured. At the end of 5 minutes, 67 cc. of hydrogen were obtained; at the end of 35 minutes, 146 cc. were obtained; at the end of 130 minutes, 192 cc. were obtained; and at the end of 240 minutes, 225 cc. were obtained whereas the uncoated lithium aluminum hydried liberated 500 cc. of hydrogen in 6 minutes under the same conditions. The remainder of the aluminum coated product was then re-treated essentially as described above maintaining the temperature between 113–132° C. and the vacuum at essentially 0.3 mm. of mercury, employing 1 part of fresh trimethylamine complex for a period of 1 hour and 50 minutes. The resulting product was then subjected to the hydrolysis test as above and in this instance, at the end of 10 minutes, only 24 cc. of hydrogen were obtained; and at the end of 60 minutes, only 44 cc. of hydrogen were obtained. An additional 8 parts of methanol were added to the mixture and at the end of 2 minutes, a total of 500 cc. of hydrogen were collected. The aluminum-coated lithium aluminum hydride product was then re-treated with an additional 1 part of aluminum hydride-trimethylamine complex as described above employing a temperature between 114–131° C. and a vacuum of 0.3 mm. of mercury pressure. Upon treating 0.6 part of the resulting product in 100 parts dioxane by adding thereto a mixture of 70 parts of dioxane and 16 parts of methanol, at the end of 4½ minutes, 500 cc. of hydrogen were collected. Another re-treatment of the product and subsequent testing with the more concentrated methanol solution resulted in only 345 cc. of hydrogen collected in 5 minutes.

Example III

Employing the apparatus of Example I, 1 part of aluminum hydride-trimethylamine complex was placed upon the lower frit and 10 parts of 200–230 mesh magnesium hydride was charged onto the upper frit. The magnesium hydride was externally heated to 150° C. and the column evacuated to 9 mm. of mercury. Hydrogen gas was then fed to the column to give a general fluidized bed action to the magnesium hydride and the aluminum hydride complex gently heated. The column was then maintained between 156–180° C. with the vacuum between 11–14 mm. of mercury and the hydrogen flow between 0.5 to 0.8 cu. ft./hr./sq. in. internal cross sectional area of the reactor column for a period of 2 hours and 5 minutes. A coating of aluminum on the magnesium hydride particles was obtained.

As indicated previously, the source of aluminum is aluminum hydride complexed with a tertiary amine. While, in general, any tertiary amine is applicable, best results are obtained when the amine vaporizes under the conditions of plating of the metal hydride and is also preferably such that its complex with aluminum hydride will vaporize at a temperature below the conditions of the plating. Thus, particularly advantageous amines which can be employed are the alkyl, cycloalkyl, aryl, and heterocyclic amines wherein each of said groups have up to about 6 carbon atoms and the total number of carbon atoms in the amine is preferably not more than about 18. Typical examples of such amines include the tertiary alkyl amines as, for example, trimethylamine, triethylamine, tripropylamine, trihexylamine, ethyldimethylamine, hexyldimethylamine, and the like; cycloalkylamines as, for example, tricyclopentylamine, tricyclohexylamine, cyclohexyldimethylamine, cyclohexyldiethylamine, and the like; tertiary aryl amines as, for example, dimethyl aniline, diethyl aniline, and the like; and heterocyclic amines as, for example, methyl pyridine, pyridine, N-methyl or N-ethyl piperidine, quinuclidine, and the like. Tertiary diamines, particularly those which are alkyl diamines wherein the alkyl portions contain up to about 6 carbon atoms are also employable as, for example, tetramethyl ethylene diamine, tetraethyl ethylene diamine, hexyl trimethyl ethylene diamine, triethylene diamine, and the like. Such amines which when complexed with the aluminum hydride result in a complex which vaporizes at temperatures below 100° C. under a high vacuum as about 1 mm. of mercury and less are especially suitable. In a particularly preferred embodiment, the trialkylamines in which each alkyl group contains up to and including about 4 carbon atoms are preferred. The number of moles of amine complexing with the aluminum hydride is variable and is generally dependent upon the amount of amine employed. Complexes having one or two moles of the amine per mole of the aluminum hydride therein have been found particularly well suited, especially aluminum hydride complexed with one or two moles of trimethylamine.

Many of the aluminum hydride amine complexes as described above are solid at standard conditions. The particle size of the solids is not critical since the complex readily vaporizes prior to contact with the metal hydride. In general, however, the smaller the particle size the more rapid the sublimation or vaporization of the complex. Thus, an effective means for controlling the rate of plating is by the particle size of the complex and the temperature of the aluminum hydride complex. For this purpose, particle sizes of the complex below about ¼ inch in major dimension are preferred.

The metal hydrides encapsulated or coated are the hydrides of the metals (including metalloids) of the first three A groups of the Periodic Chart of the Elements (as presented at pages 56 and 57 of "Handbook of Chemistry," Lange, 8th Ed. "Handbook Publishers, Inc. 1952.) which are normally solid at the temperature conditions employed for coating, e.g. Group I–A and II–A metals, especially the alkali and alkaline earth metals. Such hydrides include the simple hydrides of these metals as well as their bimetallic hydrides, particularly wherein one metal is a Group I–A or II–A metal and the other metal is a Group III–A metal (including boron). Thus, typical examples of the metal hydrides encapsulated according to the process of this invention include lithium, sodium, potassium, rubidium, cesium, beryllium, magnesium, calcium, strontium or barium hydride; lithium aluminum hydride, lithium borohydride, sodium aluminum hydride, sodium borohydride, lithium gallium hydride, lithium indium hydride, lithium thallium hydride, magnesium borohydride, magnesium aluminum hydride, beryllium borohydride, beryllium aluminum hydride, decaborane and its derivatives, and the like. Lithium hydride, beryllium hydride, magnesium hydride, and lithium, beryllium, or magnesium borohydride or aluminum hydride comprise especially preferred embodiments of the hydrides of this invention to be encapsulated with aluminum because of their high energy per unit weight and their more effective use as rocket propellants. Sodium and lithium hydride and their aluminum complex hydrides are also preferred even over the aforementioned hydrides because of their high activity and greater availability.

The form in which the aforementioned hydrides are employed is not critical since good films are obtained regardless of their shape or size. For example, the hydride can be massive or finely divided with irregular surfaces. It has been found, however, that best results are obtained when the metal hydride is at least 50 microns in size. While extremely large particles, briquettes, pellets, or blocks and the like of the metal hydride can be employed, for practical usage and more effective coatings, it is preferable that the hydride be below about ¼ inch in major dimension.

The thickness of the coating of the aluminum upon the metal hydride is, in general, dependent upon the amount of complex employed and aluminum deposited, particle size of the substrate, and its density. It is preferred to employ a sufficient amount of the complex in combination with an appropriate particle size of the metal hydride and its density to obtain a thickness of aluminum of at least 0.4 micron up to about 300 microns and higher but preferably up to about 10 microns.

The temperature conditions employed are subject to considerable latitude. In general, the metal hydride substrate is heated in a suitable manner to a temperature above the decomposition temperature of aluminum hydride, e.g. 80° C., but below the decomposition temperature or melting point, whichever is lower, of the metal hydride substrate to be coated. For best results in achieving uniform plating, it is preferable to heat the metal hydride to a temperature between 90° C.–150° C., especially between 130° C.–140° C. The aluminum hydride amine complex is heated, if necessary, to a sufficient temperature to affect its vaporization prior to contact with the metal hydride. The pressure under which the system is maintained is generally atmospheric or a vacuum. Vacuum systems are preferred in order to maintain lower plating temperatures and uniform coating of the aluminum metal. Thus, it is preferred to maintain a vacuum of between about 0.1 to 2 mm. of mercury.

While various techniques for contacting the vapors of the complex with the metal hydride substrate are applicable, the above examples have demonstrated two highly effective methods. Example I illustrates a fluidized bed technique wherein the metal hydride substrate is fluidized. In this operation, a simple, generally vertical, column is employed which will support the aluminum hydride complex in the lower portion and the finely divided metal hydride in an elevated or central zone. Thus, an inert gas, such as hydrogen, helium, nitrogen, or a rare gas, such as argon, neon, krypton, and the like, is fed to the bottom of the column at, preferably, between 0.3 to 5.0 cu. ft./hr./sq. in. internal cross sectional area of the reactor to affect a gentle continuous motion of the metal hydride substrate particles. Example II illustrates the employment of an inclined rotating reactor with the inclination being between about 5 to 15 degrees from the horizontal into which the complex is first added and then, employing a suitable means of support such as a glass wool separator or a frit, the metal hydride substrate is then inserted. The tube is evacuated and the metal hydride substrate zone heated along with a gentle heating of the complex, if necessary, and the rotation commenced. Employing this type of a reaction system results in better contact of the complex with the hydride as well as diminishing the effect of the particle size of the metal hydride. Another technique for coating the metal hydride with aluminum is to mix powders of the aluminum hydride-amine complex and the metal hydride substrate and heat the mixture, as described previously, above the decomposition temperature of aluminum hydride. Still further, the powders or particles can be mixed or suspended in a solvent of appropriate boiling point, such as the above tertiary amines or saturated or aromatic hydrocarbons, then the solvent evaporated and the aluminum hydride-amine complex which deposits on the substrate is then decomposed as above. Other means for affecting the contact of the aluminum hydride complex vapors with the metal hydride will now be evident.

The following examples will illustrate additional embodiments of the present invention.

Example IV

Employing the reactor of Example I, 3 parts of aluminum hydride-triethylamine complex are added thereto upon the lower frit and then 10 parts of finely divided sodium aluminum hydride are added to the second frit. The sodium aluminum hydride zone is heated to 130° C. and the column evacuated to 0.5 mm. of mercury. Then hydrogen gas is fed at the bottom of the column to obtain a gentle motion of the sodium aluminum hydride and the aluminum hydride-amine complex zone is heated to maintain its slow vaporization. These conditions are maintained until all of the aluminum hydride-triethylamine complex is consumed. In this manner, the sodium aluminum hydride particles are coated with a film of aluminum between about 0.4 to 10 microns in thickness.

Similar results are obtained when the above example is repeated substituting an equivalent amount of lithium aluminum hydride, potassium aluminum hydride, beryllium aluminum hydride, or strontium aluminum hydride for sodium aluminum hydride and aluminum hydride-trimethylamine complex, aluminum hydride-trihexylamine complex, aluminum hydride-hexyldimethylamine complex, for aluminum hydride-triethylamine complex.

Example V

Employing the procedure of Example I with exception that 4 parts of the complex of 1 mole of aluminum hydride with 2 moles of trimethylamine are employed and 10 parts of sodium hydride of a mesh between about 80 to 100 are substituted, sodium hydride coated with a film of aluminum of a thickness between about 0.4 to 10 microns in size is obtained.

Similar results are obtained when the above example is repeated substituting lithium hydride, potassium hydride, rubidium hydride, calcium hydride, barium hydride, beryllium hydride, or strontium hydride for sodium hydride.

Example VI

Employing the procedure of Example II, 3 parts of aluminum hydride complexed with tetramethyl ethylene diamine are placed in the lower zone and 5 parts of magnesium aluminum hydride are placed in the upper zone. The reactor is heated in the magnesium aluminum hydride zone to 125° C. Then, the system is evacuated to 0.5 mm. of mercury and these conditions maintained until essentially all of the complex has sublimed from the lower zone by warming the complex to 50 to 80° C. In this manner, a good coating of aluminum on magnesium aluminum hydride is obtained.

When the above example is repeated substituting beryllium aluminum hydride, calcium aluminum hydride, or potassium aluminum hydride for sodium aluminum hydride and tetraethylethylene diamine, ethyltrimethyl ethylene diamine, triethylene diamine, and the like diamines for tetramethylethylene diamine, similar satisfactory results are obtained.

Example VII

Employing the reactor of Example I, 6 parts of the complex of aluminum hydride with tricyclohexylamine are placed in the lower zone and 5 parts of sodium borohydride of a mesh between 40 to 60 are placed in the upper zone. The sodium borohydride zone is heated to 150° C. and the aluminum hydride complex zone heated to 130° C. and then a vacuum of 1 mm. of mercury is placed upon the system. Nitrogen gas is then fed to the bottom of the reactor at a rate sufficient to gently move the sodium borohydride particles. These conditions are maintained until essentially all of the complex is consumed. A good coating of aluminum over the sodium borohydride is obtained.

Equally satisfactory results are obtained when the above examples are repeated substituting lithium borohydride, potassium borohydride, or magnesium borohydride for sodium borohydride.

Example VIII

A fine film of aluminum on lithium aluminum hydride particles is obtained when Example I is repeated with exception that aluminum hydride-dimethyl aniline complex is substituted for the aluminum hydride-trimethylamine complex and the complex is heated gently to its vaporization temperature.

Example IX

When Example II is repeated with the exception that aluminum hydride-pyridine complex is substituted for the aluminum hydride-trimethylamine complex, a good coating of aluminum on the lithium aluminum hydride is obtained.

Example X

A film of aluminum upon lithium aluminum hydride is obtained when Example II is repeated with exception that hexyldimethylamine-aluminum hydride complex or aluminum hydride-tributylamine complex are employed in place of the aluminum hydride-trimethylamine complex.

Example XI

Powdered lithium borohydride was compressed using a die to result in pellets having a ¼ inch diameter and about ¼ inch in height. The reactor of Example II was then first charged with two parts of aluminum hydride-trimethylamine complex, and then five parts of the pelleted lithium borohydride was placed into the tube on a glass wool support above the complex. The lithium borohydride pellet zone was heated to 132° C. and the reactor evacuated to 0.5 mm. of mercury. Then, a gentle heating to about 50° C. was applied to the complex zone. The reactor was then rotated maintaining the lithium borohydride zone at 132 to 156° C. and the vacuum at 0.3 to 0.5 mm. of mercury for 4 hours. The resulting pellets had a coating of aluminum 300 microns in thickness.

Example XII

The procedure of Example II was repeated with exception that 5 parts of the lithium aluminum hydride and 2 parts of bis-[trimethylamine]aluminum hydride complex $[AlH_3 \cdot 2N(CH_3)_3]$ were employed and the lithium aluminum hydride was maintained at a temperature between 124–140° C. with the vacuum between 0.3 to 0.4 mm. of mercury for a period of 2½ hours while maintaining the complex at about 25 to 30° C. In this manner, a good coating of aluminum upon the lithium aluminum hydride was obtained.

Example XIII

When Example I is repeated with exception that an equivalent amount of finely divided decaborane is substituted for the lithium aluminum hydride with the decaborane maintained at 90 to 995° C., a fine film of aluminum is deposited on the decaborane particles.

The above examples have been presented by way of illustration and it is not intended to be limited thereto. The employment of other aluminum hydride-amine complexes, metal hydrides, temperature and pressure conditions, and the like variables in the process as discussed hereinbefore will now be evident.

The aluminum coated metal hydrides of the present invention are quite useful as propellants, particularly in rockets. By way of example, the product of Examples I, III or VI are easily handled and when employed in propellant systems produce high energies. Such coated particles have not only the advantage of easier handling, decreased reactivity with other rocket propellant components such as the oxidizers, polymers, etc., but also the combined use of the energies of both the aluminum film and the metal hydride. Other uses of the products of this invention will now be evident.

The aluminum hydride-tertiary amine complexes are prepared by known techniques, for example, the reaction of lithium aluminum hydride with aluminum chloride in benzene and the appropriate tertiary amine at room temperature and up to about 50° C. The reaction mixture is then filtered and the benzene separated by vacuum distillation.

Having thus described the process of this invention, it is not intended that it be limited except as set forth in the following claims.

What is claimed is:
1. A process for coating a metal hydride with aluminum metal which comprises contacting a metal hydride of a metal of the first three A groups of the Periodic Chart of the Elements which is solid at the contacting temperature with a complex of aluminum hydride and a tertiary amine having a total of up to and including about 18 carbon atoms while maintaining said metal hydride at a temperature above the decomposition temperature of aluminum hydride but below the decomposition temperature of said metal hydride.
2. The process of claim 1 wherein said metal hydride is a bimetallic hydride wherein one metal is selected from the group consisting of Group I–A and II–A metals and the other metal is a Group III–A metal.
3. A process for coating lithium aluminum hydride with aluminum metal which comprises contacting lithium aluminum hydride maintained at a temperature between 90 to 150° C. with aluminum hydride-trimethylamine complex vapors.
4. The process of claim 3 wherein said aluminum hydride trimethyl amine complex is a complex of 1 mole of trimethyl amine with 1 mole of aluminum hydride.
5. The process of claim 3 wherein said aluminum hydride trimethyl amine complex is a complex of 2 moles of said amine per mole of said aluminum hydride.

References Cited

UNITED STATES PATENTS

| | | | |
|---|---|---|---|
| 3,070,469 | 12/1962 | Jenkins | 149—5 |
| 2,839,423 | 6/1958 | Homer et al. | 117—107 |
| 2,921,868 | 1/1960 | Berger | 117—107 |
| 2,929,739 | 3/1960 | Breining et al. | 117—107 |
| 2,930,712 | 3/1960 | Homer et al. | 117—107 |

BENJAMIN R. PADGETT, *Primary Examiner.*

ROGER L. CAMPBELL, L. DEWAYNE RUTLEDGE,
*Examiners.*

UNITED STATES PATENT OFFICE
CERTIFICATE OF CORRECTION

Patent No. 3,376,173　　　　　　　　　　　　　　　　April 2, 1968

David R. Carley et al.

It is certified that error appears in the above identified patent and that said Letters Patent are hereby corrected as shown below:

Column 7, line 59, "995° C." should read -- 95° C. --.

Signed and sealed this 23rd day of September 1969.

(SEAL)
Attest:

Edward M. Fletcher, Jr.　　　　　　　　　　WILLIAM E. SCHUYLER, JR.
Attesting Officer　　　　　　　　　　　　　　Commissioner of Patents